United States Patent [19]

Peterson

[11] 4,150,163
[45] Apr. 17, 1979

[54] YOGURT FLAVORED CONFECTIONERIES

[75] Inventor: Marvin A. Peterson, Park Ridge, Ill.

[73] Assignee: Beatrice Foods Co., Chicago, Ill.

[21] Appl. No.: 851,358

[22] Filed: Nov. 14, 1977

[51] Int. Cl.² .............................................. A23G 3/00
[52] U.S. Cl. ..................................... 426/660; 426/583
[58] Field of Search ............... 426/583, 660, 659, 565, 426/459

[56] References Cited

U.S. PATENT DOCUMENTS

| | | | |
|---|---|---|---|
| 2,519,833 | 8/1950 | Hällquist et al. | 426/660 |
| 3,512,995 | 5/1970 | Reed | 426/659 |
| 3,730,735 | 5/1973 | Rash | 426/660 |
| 3,745,022 | 7/1973 | Broeg et al. | 426/660 |
| 3,917,875 | 11/1975 | Gardiner | 426/573 |

Primary Examiner—Jeanette M. Hunter
Attorney, Agent, or Firm—Murray & Whisenhunt

[57] ABSTRACT

There is provided a process for producing an uncooked low moisture content flavored confectionery comprising sweetener, edible fat and spray dried yogurt having an average particle size of 40 microns or less and wherein all processing steps are carried out at a temperature below 250° F. There is also provided a process for producing a cooked high moisture content yogurt flavored confectionery comprising cooking a mixture of sweetener and water to produce a soft candy, cooling the soft candy to 250° F. or less, and mixing with the candy spray dried yogurt.

18 Claims, No Drawings

YOGURT FLAVORED CONFECTIONERIES

The present invention relates to yogurt flavored confectionery. More particularly, the present invention relates to yogurt flavored candy coatings and to yogurt flavored candy centers, and to processes for their preparation.

BACKGROUND OF THE INVENTION

Yogurt has increasingly become a more popular food, and the yogurt flavor has, correspondingly, become a more widely accepted flavor. Yogurt is currently commercially produced in three forms, i.e., the natural ferment, the frozen ferment and the spray dried ferment. Natural yogurt is subject to spoilage and the shelf-life thereof, even under refrigeration, is limited. While frozen yogurt has an extended shelf-life, the difficulty of handling this form limits its usefulness to the "ice-cream" type yogurt desserts. Thus, only the spray dried yogurt is available for extending the now more widely accepted yogurt flavor to other food compositions.

Spray dried yogurt, however, has an undesirable gritty or grainy texture, somewhat similar to powdered milk. It has been found that this texture renders the spray dried yogurt unacceptable for flavoring creamy confectioneries, where the gritty texture is unacceptable. It has also been found that the delicate flavor of spray dried yogurt can be substantially deteriorated when processed according to conventional methods of making confectioneries "creamy". Thus, for example, candies, puddings, custards, etc., are traditionally cooked at relatively high temperatures to convert the gritty or grainy texture of the uncooked mixture to the customary "creamy" texture. However, when spray dried yogurt is included in such confectioneries, the normal cooking temperatures, e.g., 260° F. and above, cause a substantial deterioration of the delicate flavor of the spray dried yogurt. In particular, at temperatures of about 160° F. and above, the spray dried yogurt undergoes a flavor degradation, somewhat similar to caramelization. If the higher cooking temperatures are continued, not only will the yogurt flavor be destroyed, but a most undesirable texture will be introduced.

Finally, it has also been found that in uncooked confectioneries, e.g., compound candy coatings, where the moisture content must be very low, i.e., 1% to 2% or less, there is not sufficient moisture to hydrate the relatively hard particles of spray dried yogurt and the resulting texture is unacceptably gritty or grainy.

It would, therefore, be of substantial benefit in the art if yogurt flavored confectioneries could be provided with the shelf-stable spray dried yogurt, but without the undesired deterioration of the yogurt flavor or the undesired texture.

OBJECTS OF THE INVENTION

It is therefore an object of the invention to provide confectioneries which are flavored with spray dried yogurt, where the yogurt flavor is not substantially deteriorated, where undesired flavors are not introduced into the confectioneries and where the texture is "creamy". It is a further object of the invention to provide methods for producing such confectioneries. Other objects will be apparent from the following description and the annexed claims.

SUMMARY OF THE INVENTION

The invention is based on two discoveries. Firstly, it has been discovered that spray dried yogurt cannot be subjected to the higher traditional cooking temperatures, i.e., above about 260° F., since the above-noted flavor deterioration will result. Secondly, it has been discovered that an acceptable "creamy" texture necessary for such confectioneries can be achieved without the higher cooking temperatures or the presence of moisture for hydration of the spray dried yogurt particles, when the spray dried yogurt has been reduced in average particle size to a fine powder. The precise average particle size required will vary, depending on the required customary "creaminess" of the particular confectionery, but normally, the average particle size must be less than 40 microns. With the smaller average particle size, the spray dried yogurt may be used to flavor conventional confectioneries to yield a highly yogurt flavored composition with the required "creamy" texture, without the unacceptable cooking.

Briefly stated, in one embodiment the invention provides a process for producing an uncooked, low-moisture content yogurt flavored confectionery which comprises forming a mixture of 10 to 65 parts of a sweetener, 20 to 50 parts of an edible fat and 3 to 30 parts of spray dried yogurt which has an average particle size of 40 microns or less, and wherein all necessary steps are carried out at temperatures below 250° F., whereby the flavoring of the confectionery is not substantially deteriorated and the texture of the confectionery is "creamy".

In another embodiment of the invention, there is provided a process for producing a cooked, high moisture content yogurt flavored confectionery which comprises cooking a mixture of 10 to 65 parts of sweetener and 5 to 15 parts water at 250° F. or above until a soft candy composition is obtained, cooling the cooked composition to 250° F. or less and mixing with 3 to 35 parts of spray dried yogurt.

The corresponding compositions are obtained, i.e., an uncooked, low moisture content yogurt flavored confectionery comprising a mixture of 10 to 65 parts sweetener, 20 to 50 parts of an edible fat and 3 to 30 parts of a spray dried yogurt which has a particle size of 40 microns or less, and a cooked, high moisture content yogurt flavored confectionery comprising a mixture of a soft candy of cooked sweetener, 10 to 65 parts, and water, 5 to 15 parts, and 3 to 35 parts of uncooked spray dried yogurt.

DETAILED DESCRIPTION OF THE INVENTION

As briefly noted above, the invention comprises two major embodiments, i.e., uncooked low moisture content confectioneries and cooked high moisture content confectioneries. Both of these embodiments require that the spray dried yogurt be uncooked, but the former embodiment additionally requires that the average particle size of the spray dried yogurt be 40 microns or less, while the latter embodiment does not have that requirement. This differences is because the cooked high moisture content confectionery will have sufficient moisture associated therewith that the spray dried yogurt will eventually hydrate in the candy composition and form relatively soft hydrated particles. Thus, the hydration will eliminate the gritty or grainy texture which would otherwise result. Significant hydration will not take place at moisture contents of about 2% or less and, accordingly, for purposes of the present specification, low moisture content confectioneries are defined as those confectioneries which have about 2% moisture or less, while high moisture content confectioneries are defined as those confectioneries having moisture contents of about 2% moisture or greater. More preferably, however, the low moisture content confectioneries are defined as those having 1.5% moisture or less and the high moisture content confectioneries are defined as those having 2.5% moisture or more.

Low moisture content confectioneries are exemplified by the conventional candy coatings, i.e., candy bar coatings, candy drop coatings, ice cream and popsicle coatings, decorative cake coatings, and the like. For the sake of conciseness, therefore, this embodiment will be illustrated in terms of a conventional candy coating.

The candy coating, in addition to the spray dried yogurt flavoring, must contain sweetener and an edible fat. The sweetener may be any of the conventional sweeteners, including sucrose, xylose, sorbitol, mannitol, dextrose, dextran and maltrin. Of course, since the candy coating will be a low moisture content candy coating, the sweeteners will be in a dried form, for example fine granulated sugar or partially inverted sugar, and not in a syrup or other moist form. Additionally, while not preferred, artificial sweeteners, such as saccharine, may be used, at least in part. The particular amount of sweetener will vary with the particular candy coating desired. Thus, where the candy to be ultimately produced should have an overall tart flavor, smaller amounts of sweetener will be used, while a candy which is intended to have an overall sweet flavor will have larger amounts of sweetener. Additionally, the proportion of sweetener will vary with the particular sweetener used. Thus, for the same sweetness of the ultimate candy, smaller amounts of sucrose will be required than the amount of sorbitol, etc., to produce the same sweetening effect. For most compositions, from 10 to 60 parts sweetener will be satisfactory, although generally the sweetener will be between 20 and 55 parts.

The edible fat provides a vehicle for carrying the sweetener and yogurt flavoring. That vehicle must be consistent in properties with the candy intended. Thus, if the candy coating is designed for a chocolate-type candy, the coating will be relatively soft, and will quickly liquify at masticating temperatures. On the other hand, if the candy intended is of the "hard caramel"-type, then higher melting point fats will be used. The Whiley melting point of the fat may vary from as low as 50° F. to as high as 125° F., although more usually this melting point will be between about 80° F. and 110° F. Any of the conventional fats, in the natural or hydrogenated state, may be used, e.g., soybean oil, safflower oil, corn oil, cotton seed oil, coconut oil, coconut fat, and the like. The amount of fat will vary with the desired characteristics of the final candy. Thus, where a very creamy candy is to be produced, larger amounts of fat will be used, whereas a candy which is less creamy will have smaller amounts of fat. Generally, from 20 to 50 parts of fat will be satisfactory, although usually the fat will be present in an amount of 25 to 45 parts, more usually 28 to 33 parts.

The amount of spray dried yogurt used in the candy coating can vary from as little as 3 parts for very light flavorings to as high as 30 parts for more heavy flavorings. However, generally, the proportion of spray dried yogurt will be between 8 and 25 parts, and more usually between 12 and 30 parts.

The particle size of the spray dried yogurt may be reduced to a powder of 40 microns or less average particle size by any convenient, conventional means, e.g., hammer mill, roll mill, pebble mill, rod mill and the like. This powdered yogurt may be added to the sweetener or the fat or to a combination thereof. Alternatively, the spray dried yogurt may be added to either the sweetener or fat, or the combination thereof, and the total composition may be milled to reduce the average particle size of the powdered yogurt to less than 40 microns. This may be considered an in situ powdering of the spray dried yogurt. This latter embodiment is, indeed, a preferred embodiment, since this will provide a very intimate mixture of the fat, sweetener and spray dried yogurt. In this in situ method, any of the conventional milling apparatus noted above may be used, but a conventional "concher" is quite acceptable. Conchers are roll mills, e.g., a three roll mill which operates in the nature of an ink mill to grind solids into a liquid. Alternatively, shearing devices, as disclosed in U.S. Pat. No. 3,976,806, commonly assigned herewith, may be used. These shearing devices are typified by the URSCHEL COMITROL (trademark) 1250. Indeed, the overall process of that patent may be used for producing the candy coating of the present invention by the in situ method, if modified so that temperatures never exceed 250° F. Also, contrary to the process of that patent, the present mixing time (conching time) can substantially exceed 30 seconds, since the problems of flavor deterioration associated with cocoa are not the same as the problems associated with deterioration of flavor in spray dried yogurt. Further, a premixing is not required in the present process.

Irrespective of which apparatus is used to reduce the particle size of the spray dried yogurt to less than 40 microns and regardless of whether the separate grinding operation or the in situ milling operation is employed, it is essential, when producing the uncooked, low moisture content confectionery, that all of the steps are carried out at temperatures below 250° F. Otherwise, the undesired flavor deterioration described above will commence. Preferably, the temperature will be at least 40° F., e.g., between 50° F. and 80° F.

Thus, by providing the fine powdered spray dried yogurt with the sweetener and fat at processing temperatures less than 250° F., the yogurt flavor is not substantially deteriorated and the texture of the resulting confectionery is creamy. In this latter regard, the term "creamy" is defined as that mouth feel experienced in masticating the confectionery where the presence of particulate solids is not substantially detectable. The average particle size of the spray dried yogurt to provide the creamy texture must be less than 40 microns and preferably less than 35 microns. A satisfactory range is between 20 and 30 microns, although smaller particle sizes may be used as desired. Below 20 microns, however, little additional "creaminess" is achieved.

As noted above, another embodiment of the invention is in connection with high moisture content confectioneries. Since these confectioneries will have sufficient moisture associated therewith to achieve hydration of spray dried yogurt, it is not necessary to grind the spray dried yogurt to 40 microns or less as is the case in the low moisture content candy coating. The moisture of the high moisture content confectioneries will cause hydration of the spray dried yogurt and the hydrated particles are quite soft and easily chewable. The hydrated particles do not exhibit a grainy or gritty mouth feel. However, the flavor deterioration discussed above will result if the hydrated yogurt is cooked and, accordingly, even in the high moisture content confectioneries, cooking of the yogurt, either in the unhydrated or hydrated form, must be avoided. However, as is well known, the high moisture content confectioneries must be cooked in order to provide the necessary consistency or viscosity. These cooked confectioneries are referred to in the art and herein as a "soft candy". This term is defined herein to mean a cooked combination of at least a sweetener and water, wherein the cooking is at a temperature of at least 250° F. and the cooking time/temperature has been sufficient to congeal the sweetener/water into a chewy, semi-solid. The congealed mixture may exhibit cold flow, but it will not be a fluid at room temperature. Stated another way, the congealed mixture will essentially retain its shape at room temperature for a substantial period of time, i.e., at least one hour and more usually one day or more.

According to the present invention, the water/sweetener combination is cooked to produce a soft candy and, after cooling, the soft candy composition is mixed with the spray dried yogurt. Hydration of the spray dried yogurt will then take place to produce the required texture, but the yogurt will not have experienced the higher cooking temperatures, and the flavor deterioration noted above will not take place.

The proportions for the soft candy compositions will be similar to the proportions used for producing the candy coating, i.e., 10 to 65 parts of sweetener and 3 to 35 parts of spray dried yogurt. The composition will also contain 5 to 15 parts of water. Here again, the sweetener may be any of the conventional sweeteners, for example sucrose or the further sugars disclosed in connection with the candy coating. It is, however, preferred that at least part of the sweetener be corn syrup or corn syrup solids. Usually from 25% to 75% of the sweetener will be corn syrup or corn syrup solids, although it is preferred that the corn syrup or corn syrup solids constitute 40% to 60% of the sweetener.

Depending upon the particular sweetener involved, and the degree of gelation of the soft candy, from 5 to 15 parts of water will be used, but more usually between 7 and 12 parts of water will be used.

The sweetener and water are cooked in the conventional manner, e.g., a steam jacketed kettle with stirring, until the soft candy composition is obtained. The cooking temperature will be at least 250° F. but more usually will be at least 255° F. An optimum cooking temperature is between 258° F. and 260° F., but always less than 400° F. After cooking the soft candy, the composition is cooled to below 250° F. and more preferably below 240° F. In order to ensure that essentially no deterioration of the flavor of the spray dried yogurt occurs, the soft candy should be cooled to less than 190° F. and preferably to 180° F. or less. Thereafter, the spray dried yogurt is mixed with the soft candy by any conventional mixing means, e.g., paddle mixers, Lightin Mixers (trademark) and the like. Although satisfactory mixing of the spray dried yogurt and the soft candy can be achieved at temperatures of 140° F. or less, it is preferred to conduct the mixing at about 160° F. to 180° F. as the soft candy is still relatively fluid at these temperatures and intimate mixing is thereby achieved. After this mixing, the yogurt-containing soft candy is cooled and molded as desired.

The compositions (both the coating and the soft candy) may contain additional ingredients, such as emulsifiers, other flavors, salt and coloring. Preferred amounts of these ingredients are 0.1 to 2 parts emulsifier, e.g., glycerol mono-stearate and lecithin, 0.1 to 2 parts flavors, e.g., vanilla, cherry, strawberry, blueberry, raspberry, etc., 0.1 to 1 part salt and 0.1 to 1 part coloring, e.g., USDA colors. Further, 0.1 to 2 parts of lactic acid may be used to provide a tart taste and 0.1 to 1 part of an aerating agent may be used, e.g., polyglycerol.

Thus, the present invention enables the satisfactory and convenient preparation of candies having a natural yogurt flavor or a flavor of strawberry/yogurt, raspberry/yogurt, blueberry/yogurt and the like. In particular, the candies of the present invention possess a novel and unusual feature of combining the somewhat acidic, sharp taste of yogurt with a sweeter candy composition to give a product exhibiting a flavor very close to that of natural unflavored or flavored yogurt.

The present invention will now be illustrated by the following examples, although the invention is not limited thereto and is fully applicable to the foregoing disclosure. In the examples, as well as in the specification and claims, all percentages and parts are by weight, unless otherwise indicated.

EXAMPLE 1

| Preparation of Yogurt Flavored Candy Coating | |
|---|---|
| Ingredient | Weight % |
| Fine granulated sugar | 47.17 |
| Spray dried yogurt (Sanna Div. of Beatrice Foods Co.) | 19.85 |
| Fat (SFI-50°-92° hard butter-Satina* Durkee Famous Foods)** | 33.75 |
| Salt | 0.10 |
| Color (Lake Strawberry insoluble red) | 0.04 |
| Flavor (Strawberry - Givaudan Corp) | 0.20 |
| Lactic Acid (85% Beatreme* 3436) | 0.50 |
| Double bleached lecithin | 0.40 |

*trademark
**SFI

| ° F. | % solid |
|---|---|
| 50 | 69–72 |
| 70 | 62–65 |
| 80 | 49–53 |
| 92 | 4.5 max |
| 100 | 0 |

The above-listed ingredients were milled on a 3 roll mill until the gritty texture had disappeared. At this point, the particle size of the ingredients was about 10 to 20 microns or less. The milled ingredients were then remelted and used as a candy coating. Alternatively, the coating may be cast into slabs (10 to 15 pounds each) for shipping, or shipped hot. During the milling and melting, the spray dried yogurt powder was never subjected to the high candy cooking temperatures (250° F. or higher). The moisture content of the candy composition was about 1%.

EXAMPLE 2

Preparation of Yogurt Flavored Soft Center for a Candy

In a first step, the following ingredients were cooked at about 250° F. to 260° F. to produce approximately 700 pounds of a soft center composition for a candy.

| Ingredients | Pounds |
| --- | --- |
| 43 Dextrose equivalent corn syrup | 330 |
| Granulated sugar | 374 |
| Water | 60 |
| Glycerol mono-stearate (Aldo brand)-emulsifier | 12 |
| Partially inverted sugar (Numaline brand) | 24 |
| Polyglycerol (aerating agent) | 5 |

After completion of the cooking of the above ingredients, the composition was cooled below 180° F. and the following ingredients were mixed into the composition.

| Ingredients | Pounds |
| --- | --- |
| Fondant (a partially inverted sugar used to produce a "short" texture) | 145 |
| Frappe* | 108 |
| 95° F. melt oil | 100 |
| Lactic acid (88%) | 5 |
| Spray dried yogurt | 100 |
| Givaudan Corp. Strawberry flavor | 0.5 |
| Salt | 3.0 |

*made by cooking 37.5 pounds corn syrup at 247° F., adding 37.5 pounds uncooked corn syrup, 0.75 pounds imitation or natural egg allumin, 0.1 pound inverted sugar in 2.5 pounds water and whipped to a froth.

The entire composition was then aerated and whipped, followed by casting on a cooling table and cutting to size. The moisture content of the resulting yogurt flavored soft center candy composition was about 7% to 8%.

What is claimed is:

1. A process for producing an uncooked, low moisture content yogurt flavored confectionery, which comprises the step of forming a mixture of:
   (a) 10 to 65 parts sweetener;
   (b) 20 to 50 parts edible fat; and
   (c) 3 to 30 parts of spray dried yogurt,
wherein the spray dried yogurt has an average particle size of 40 microns or less, and wherein the mixing step is carried out at temperatures below 250° F., whereby the yogurt flavor is not substantially deteriorated and the texture of the confectionery is creamy.

2. A process according to claim 1, wherein the mixture also includes an emulsifier and flavor.

3. A process according to claim 1, wherein the mixture comprises 10 to 20 parts spray dried yogurt, 40 to 50 parts sweetener, and 30 to 35 parts fat.

4. A process according to claim 1, wherein the temperature of the mixture is maintained at about 50° F. to about 80° F. during the mixing step.

5. A process according to claim 1, wherein the spray dried yogurt has the said particle size prior to mixing with the sweetener and fat.

6. A process according to claim 1, wherein the spray dried yogurt has a particle size greater than 40 microns prior to mixing with the sweetener or fat and the mixing therewith reduces the particle size to less than 40 microns.

7. A process according to claim 6, wherein the mixing is by milling and the milling is continued until the mixture has a particle size of 10 to 20 microns or less.

8. A process for producing a cooked, high moisture content yogurt flavored confectionery, which comprises:
   (1) cooking a mixture of:
      (a) 10 to 65 parts sweetener; and
      (b) 5 to 15 parts water,
   at 250° F. or above, until a soft candy composition is obtained wherein the soft candy is a chewy, semi-solid;
   (2) cooling the soft candy composition to below 250° F. or less, and
   (3) mixing the candy with 3 to 35 parts spray dried yogurt.

9. A process according to claim 8, wherein the mixture also includes an emulsifier.

10. A process according to claim 8, wherein the sweetener of the mixture contains 40 to 60 parts corn syrup, 50 to 55 parts sugar and 7 to 9 parts water.

11. A process according to claim 8, wherein in step (2) the soft candy composition is cooled to 160° F. to 180° F.

12. An uncooked, low moisture content yogurt flavored confectionery having a creamy texture and a substantially undeteriorated yogurt flavor, said confectionery comprising 10 to 65 parts sweetener, 20 to 50 parts edible fat and 3 to 30 parts spray dried yogurt, wherein the spray dried yogurt has an average particle size of 40 microns or less and has not been subjected to a temperature of 250° F. or higher.

13. A confectionery according to claim 12, wherein the mixture also includes an emulsifier and flavor.

14. A confectionery according to claim 12, wherein the mixture comprises 10 to 20 parts spray dried yogurt, 40 to 50 parts sweetener, and 30 to 35 parts fat.

15. A confectionery according to claim 12, wherein the particle size is 20 microns or less.

16. A cooked, high moisture content yogurt flavored confectionery having a substantially undeteriorated yogurt flavor, said confectionery comprising 10 to 65 parts sweetener, 5 to 15 parts water and 3 to 35 parts spray dried yogurt, wherein the spray dried yogurt has not been subjected to a temperature of 250° F. or higher.

17. A confectionery according to claim 16, wherein the mixture also includes an emulsifier.

18. A confectionery according to claim 16, wherein the sweetener of the mixture contains 40 to 60 parts corn syrup, 50 to 55 parts sugar and 7 to 9 parts water.

* * * * *